United States Patent
Bershad et al.

(10) Patent No.: US 7,627,111 B2
(45) Date of Patent: Dec. 1, 2009

(54) NOISE MATCHING FOR ECHO CANCELLERS

(75) Inventors: Neil J. Bershad, Newport Beach, CA (US); Anurag Bist, Newport Beach, CA (US); Stan Hsieh, Diamond Bar, CA (US)

(73) Assignee: Intel Corporation, Santa Clara, CA (US)

( * ) Notice: Subject to any disclaimer, the term of this patent is extended or adjusted under 35 U.S.C. 154(b) by 1026 days.

(21) Appl. No.: 10/305,222

(22) Filed: Nov. 25, 2002

(65) Prior Publication Data

US 2004/0100916 A1   May 27, 2004

(51) Int. Cl.
*H04M 9/08* (2006.01)
(52) U.S. Cl. ............................... 379/406.02
(58) Field of Classification Search ............ 379/406.03, 379/406.02
See application file for complete search history.

(56) References Cited

U.S. PATENT DOCUMENTS

| | | | |
|---|---|---|---|
| 5,521,908 A * | 5/1996 | Younce et al. ............. 370/286 |
| 5,699,424 A | 12/1997 | Hirano | |
| 5,771,440 A | 6/1998 | Sukhu et al. | |
| 5,857,167 A | 1/1999 | Gritton et al. | |
| 6,028,929 A | 2/2000 | Laberteaux | |
| 6,163,608 A * | 12/2000 | Romesburg et al. .... 379/406.01 |
| 6,181,794 B1 | 1/2001 | Park et al. | |
| 6,597,787 B1 * | 7/2003 | Lindgren et al. ....... 379/406.05 |
| 6,606,382 B2 | 8/2003 | Gupta | |
| 6,700,978 B2 * | 3/2004 | Bershad et al. ........ 379/406.08 |
| 6,718,035 B2 | 4/2004 | Younce et al. | |
| 6,980,528 B1 * | 12/2005 | LeBlanc et al. ............ 370/290 |
| 2002/0071547 A1 | 6/2002 | Bershad et al. | |
| 2002/0093919 A1 | 7/2002 | Bershad et al. | |
| 2003/0219113 A1 | 11/2003 | Bershad et al. | |
| 2004/0037417 A1 | 2/2004 | Seibert | |

FOREIGN PATENT DOCUMENTS

| EP | WO 01/33814 A1 * | 5/2000 |
|---|---|---|
| WO | WO 01/33814 A1 | 5/2001 |

OTHER PUBLICATIONS

C. Breining et al., "Acoustic Echo Control—An Application of Very High-Order Adaptive Filters", IEEE Signal Processing Magazine, vol. 16, No. 4, pp. 42-70, Jul. 1999.

P. Heitkamper, An Adaptation Control for Acoustic Echo Cancelleres, IEEE Signal Processing Letters, vol. 4, No. 6, pp. 170-172, Jun. 1997.

(Continued)

Primary Examiner—Alexander Jamal
(74) Attorney, Agent, or Firm—Blakely, Sokoloff, Taylor & Zafman LLP

(57) ABSTRACT

An embodiment of the present invention includes an adaptive predictor, a system white noise generator, and a background noise estimator. The adaptive predictor estimates adaptive weights of autoregressive (AR) model of background noise as background samples in an echo canceler. The adaptive predictor generates adaptive error. The system white noise generator generates a white noise using the adaptive error. The noise background estimator estimates the background noise using the white noise and the estimated adaptive weights.

35 Claims, 14 Drawing Sheets

OTHER PUBLICATIONS

A. Mader et al., "Step-Size Control for Acoutic Echo Cancellation Filters—An Overview", Signal Processing (EURASIP), vol. 80, No. 9, pp. 1697-1719, Sep. 2000.

S. G. Sankaran et al., "Fast Generalized Affine Projection Algorithm", Int. J. of Adaptive Control and Signal Processing, vol. 14, pp. 623-641, 2000.

Jones D J et al., "A Network Speech Echo Canceller with Comfort Noise" 5th European Conference on Speech Communication and Technology. Eurospeech '97; vol. 5 of 5; Sep. 22, 1997; pp. 2607-2610.

Gansler, et al., A Robust Proportionate Affine Projection Algorithm for Network Echo Cancellation, 2000. IEEE Int. Conf. on Acoustic, Speech, and Signal Processing (ASSP-'00), vol. 2, Jun. 5-9, 2000, pp. 11793-11796.

* cited by examiner

NOISE MATCHING FOR ECHO CANCELLERS

BACKGROUND

FIELD

Embodiments of the invention relate to the field of communication, and more specifically, to echo cancellation.

BACKGROUND

Acoustic echo is an inherent problem in the design of speech processing equipment such as telephone network and wireless handsets. Echo cancellation is a technique to reduce the amount of echo in the voice transmission by estimating the echo picked up on the microphone or line on the transmitting side and subtracts it from the ear piece or handsfree speaker on the receiver side. Since the exact model of the environment is not known and time-varying, adaptive techniques are typically used to estimate the echo.

When the far-end signal in the send input speech data is canceled below some threshold level, the residual echo is reduced by a non-linear processor. The cancellation is typically not perfect for a number of reasons. First, there may not be sufficient training time for the adaptation. Second, the far-end residual can at best be canceled to the background noise level. Typically, the non-linear processor removes this far-end residual as well as the background noise by generating no output signal. These null periods do not sound natural to the human ear.

BRIEF DESCRIPTION OF THE DRAWINGS

The invention may best be understood by referring to the following description and accompanying drawings that are used to illustrate embodiments of the invention. In the drawings.

DESCRIPTION

Figure 1:
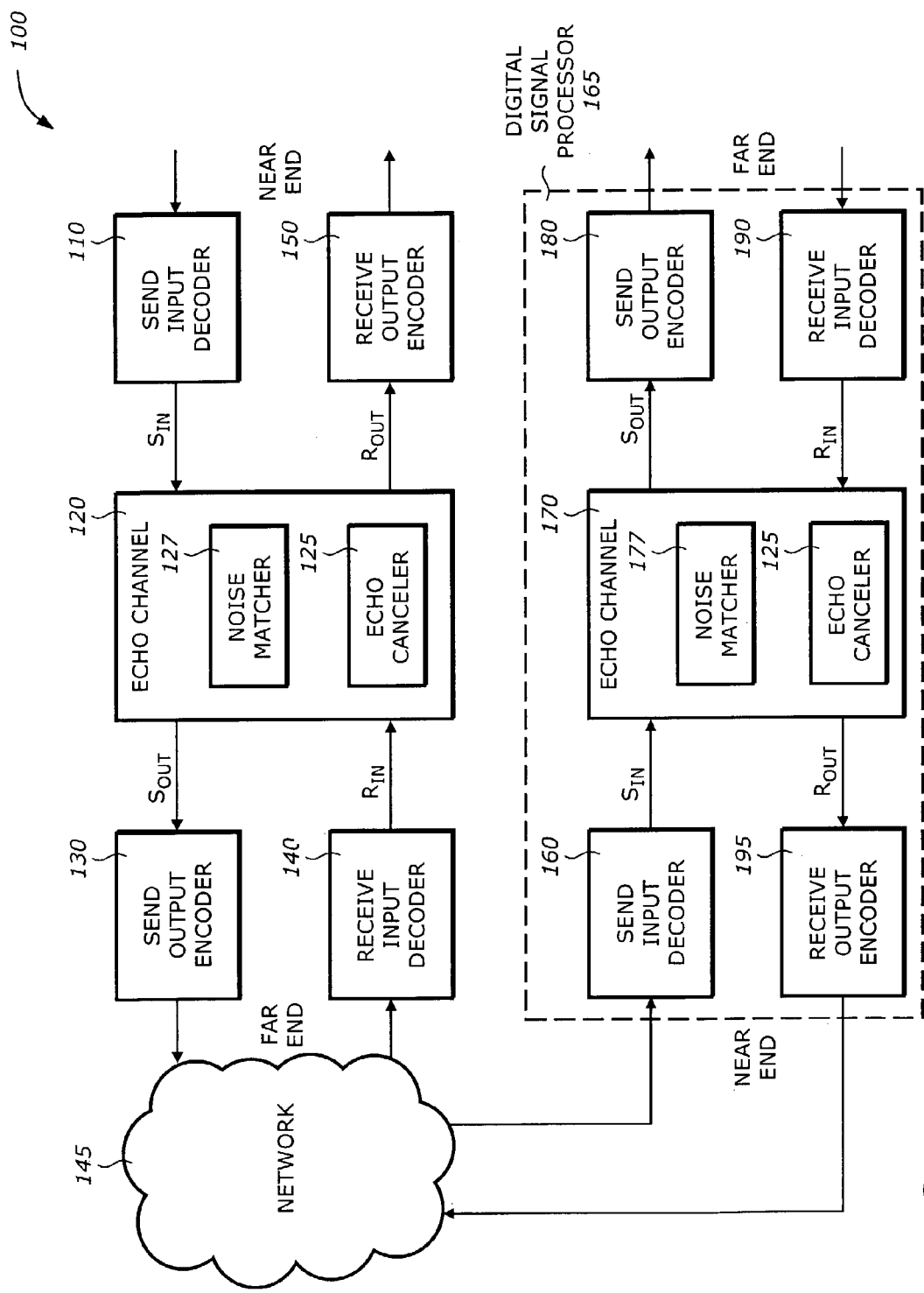
FIG. 1 is a diagram illustrating a system in which one embodiment of the invention can be practiced.

An embodiment of the present invention includes an adaptive predictor, a system white noise generator, and a background noise estimator. The adaptive predictor estimates adaptive weights of autoregressive (AR) model of the background noise using as background samples in an echo canceler. The adaptive predictor generates adaptive error. The system white noise generator generates a white noise using the adaptive error. The background noise estimator estimates the background noise using the white noise and the estimated adaptive weights.

In the following description, numerous specific details are set forth. However, it is understood that embodiments of the invention may be practiced without these specific details. In other instances, well-known circuits, structures, and techniques have not been shown in order not to obscure the understanding of this description.

Elements of one embodiment of the invention may be implemented by hardware, firmware, software or any combination thereof. When implemented in software, the elements of an embodiment of the present invention are essentially the code segments to perform the necessary tasks. The software may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term "data" here refers to any type of information that is encoded for machine-readable purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

FIG. 1 is a diagram illustrating a system 100 in which one embodiment of the invention can be practiced. The system 100 includes a send input decoder 110, an echo channel 120, a send output decoder 130, a receive input decoder 140, a receive output encoder 150, a network 145, a send input decoder 160, an echo channel 170, a send output decoder 180, a receive input decoder 190, and a receive output encoder 195.

The send input decoder 110 receives the encoded speech from a first near end and decodes the encoded speech into linear speech data $S_{in}$. In one embodiment, the send input decoder 110 is a μ-Law/A-Law decoder. The echo channel 120 includes an echo canceller 125 and a noise matcher 127. The echo canceller 125 removes an echo estimated signal from the linear data samples $S_{in}$ to generate linear data samples $S_{out}$. The noise matcher 127 provides background noise to the echo canceler 125 when the non-linear processor cancels the echo. The send output encoder 130 provides speech compression before packetizing. In one embodiment, the send output encoder 130 is a G.7xx encoder which compresses the speech data $S_{out}$ from the echo channel 120 using any one of the compression standards for low-bit rate voice (LBRV) including the International Telecommunication Union (ITU)-T internationally standardized G.7xx series. The compressed speech data are sent to the far end via a network. The receive input decoder 140 de-compresses the speech data received from the first far end over the network 145. The de-compression technique is compatible with the compression used in the send output encoder 130. The echo channel 120 receives the $R_{in}$ from the receive input decoder 140 and sends out the $R_{out}$ linear data samples. The receive output encoder 150 encodes the linear data samples $R_{out}$ into μ-Law and A-law encoded speech to be sent out to the first near end.

The network 145 is any network having capability to transmit packetized data from and to the send output decoder 130, the send input decoder 160, the receive input decoder 140, and the receive output decoder 195. The network 145 may be the Internet, an intranet, an extranet, a local area network (LAN), or a wide area network (WAN). The send input decoder 160 receives the encoded speech from the network 145 and decodes the encoded speech into linear speech data $S_{in}$. In one embodiment, the send input decoder 160 is a μ-Law/A-Law decoder. The echo channel 170 includes an echo canceller 175 and a noise matcher 177. The echo canceller 175 removes an echo estimated signal from the linear data samples $S_{in}$ to generate linear data samples $S_{out}$. The noise matcher 177 is essentially the same as the noise matcher 127. In the following, the description of the noise matcher 127 is applicable for the noise matcher 177. The send output encoder 180 provides speech compression before packetizing. In one embodiment, the send output encoder 180 is a G.7xx encoder which compresses the speech data $S_{out}$ from the echo channel 170 using any one of the compression standards for low-bit rate voice (LBRV) including the International Telecommunication Union (ITU)-T internationally standardized G.7xx series. The compressed speech data are sent to a receiving device at the second far end. The receive input decoder 190 de-compresses the speech data received from the second far end. The de-compression technique is compatible with the compression used in the send output encoder 180. The echo channel 170 receives the $R_{in}$ from the receive input decoder 190 and sends out the Rout linear data samples. The receive output encoder 190 encodes the linear data samples $R_{out}$ into μ Law and A-law encoded speech to be sent out to the second near end to the network 145. In one embodiment, the send input decoder 160, the echo channel 170, the send output decoder 180, the receive input decoder 190, and the receive output encoder 195 are integrated into a digital signal processor 165.

Figure 2:
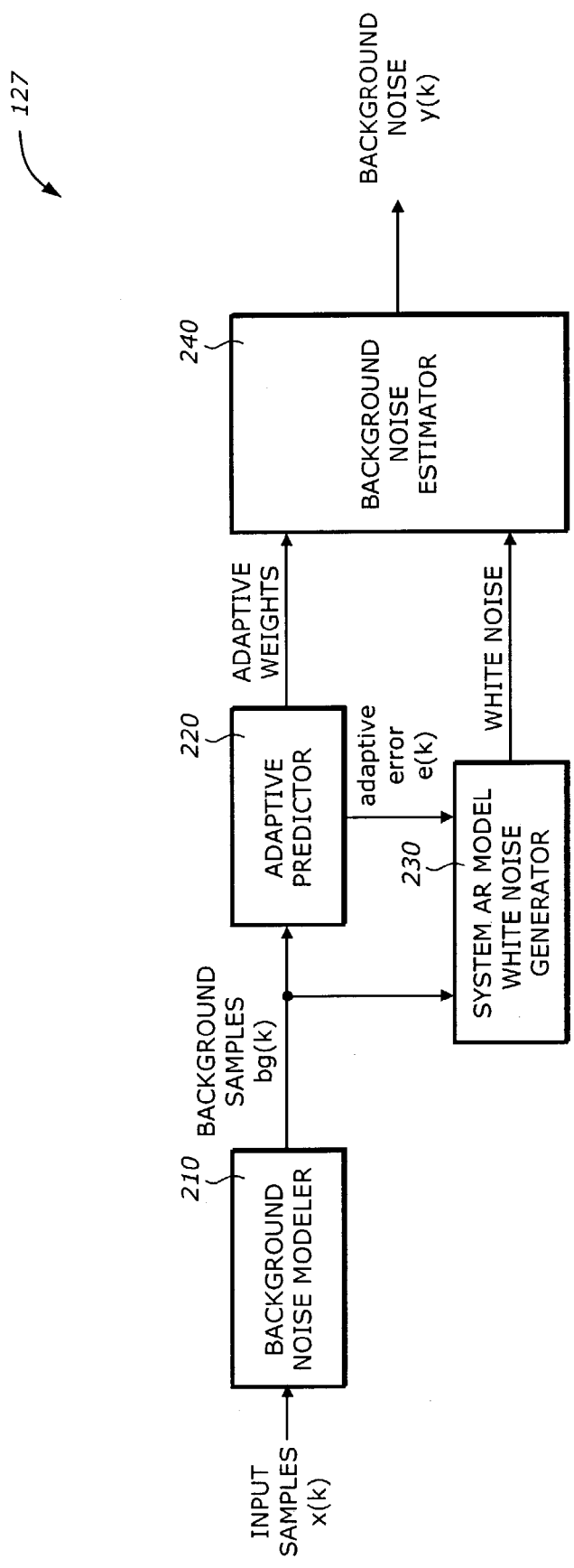
FIG. 2 is a diagram illustrating a noise matcher according to one embodiment of the invention.

FIG. 2 is a diagram illustrating a noise matcher 127 according to one embodiment of the invention. The noise matcher 127 includes a background noise modeler 210, an adaptive predictor 220, a system AR model white noise generator 230, and a background noise estimator 240. The background noise modeler 210 generates background samples bg(k) from input samples Sin. The adaptive predictor 220 estimates the auto-regressive (AR) adaptive weights of background noise from the background samples bg(k). The adaptive predictor 220 generates an adaptive error e(k) and adaptive weight vector W. The adaptive weight vector W include the adaptive weights $w_i$'s of the predictor. The system AR model white noise generator 230 generates a white noise using the adaptive error e(k) and the background samples bg(k). The background noise estimator 240 estimates the background noise using the white noise and the estimated adaptive weight W.

The basic theory of the technique is that if the estimated AR model of the background noise is driven with white noise of the same power as the prediction error power, the output of this system is a sample function of a random process whose spectrum is a reasonably good estimate of the power spectrum of the background noise. Therefore, this output should sound like the real background noise.

Figure 3:
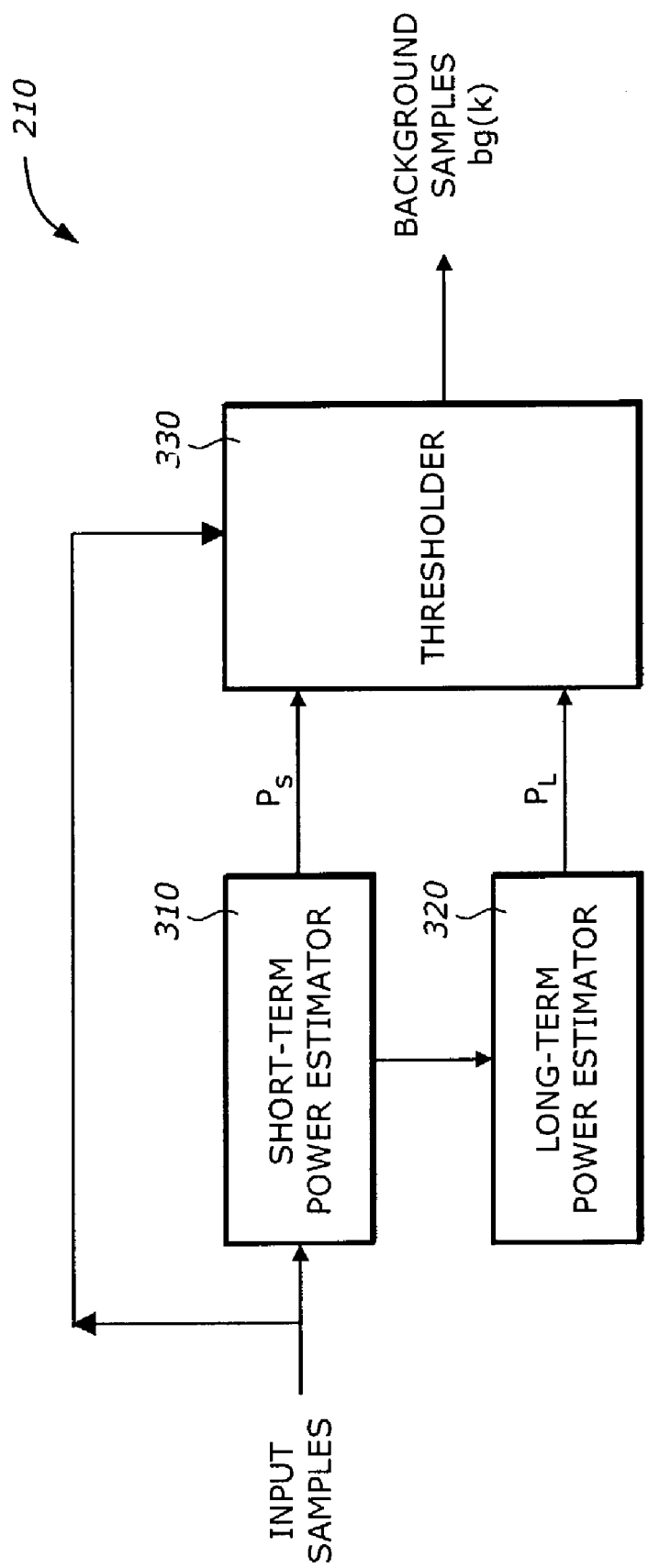
FIG. 3 is a diagram illustrating a background noise modeler shown in FIG. 2 according to one embodiment of the invention.

FIG. 3 is a diagram illustrating the background noise modeler 210 shown in FIG. 2 according to one embodiment of the invention. The background noise modeler 210 includes a short-term power estimator 310, a long-term power estimator 320, and a thresholder 330.

The short-term and long-term power estimators 210 and 220 estimate the short-term and long-term powers of the input samples x(n) in the far-end input data $S_{in}$. Let $p_S$ and $p_L$ be the short-term and long-term powers, respectively. The computations of $p_S$ and $p_L$ may be carried out as follows.

$$x_1(k)=x(k)^2 \qquad (1)$$

$$\text{if } x_1(k)>p_s(k): p_s(k)=(1-\gamma_r)x_1(k)+\gamma_r p_s(k-1) \qquad (2)$$

$$\text{else } p_s(k)=(1-\gamma_f)x_1(k)+\gamma_f p_s(k-1) \qquad (3)$$

$$\text{if } p_S(k)<\beta p_L(k-1): p_L(k)=(1-\alpha)x_1(k)+\alpha p_L(k-1) \qquad (4)$$

$$\text{else } p_L(k)=p_L(k-1) \qquad (5)$$

where $\gamma_r$ and $\gamma_f$ are time constants for increasing and decreasing input power, respectively; $\beta$ is a threshold for power measurement; $\alpha$ is a time constant for long-term power estimate. In one embodiment, $\gamma_r=1-1/24$ and $\gamma_f=1-1/240$; $\beta=4$; and $\alpha=1-1/24000$.

The thresholder 330 generates the background samples in response to the short-term power being less than an indicator of the long-term power. An indicator of the long-term power $p_L$ is a multiple of the long-term power such as $kp_L$ where k is a positive integer. In one embodiment, k=2. The background samples bg(k) are equal to zero, or some marking value, when the input samples $S_{in}$ are not likely to contain the background noise. The condition that the input samples $S_{in}$ are most likely to contain background noise is when the short-term power $p_S > kp_L$. In other words:

if $p_S < kp_L$, $bg(k) = x(k)$ (6)

else $bg(k) = 0$

The background samples bg(k)'s are then forwarded to the adaptive predictor 220 and the system AR model white noise generator 230.

Figure 4:
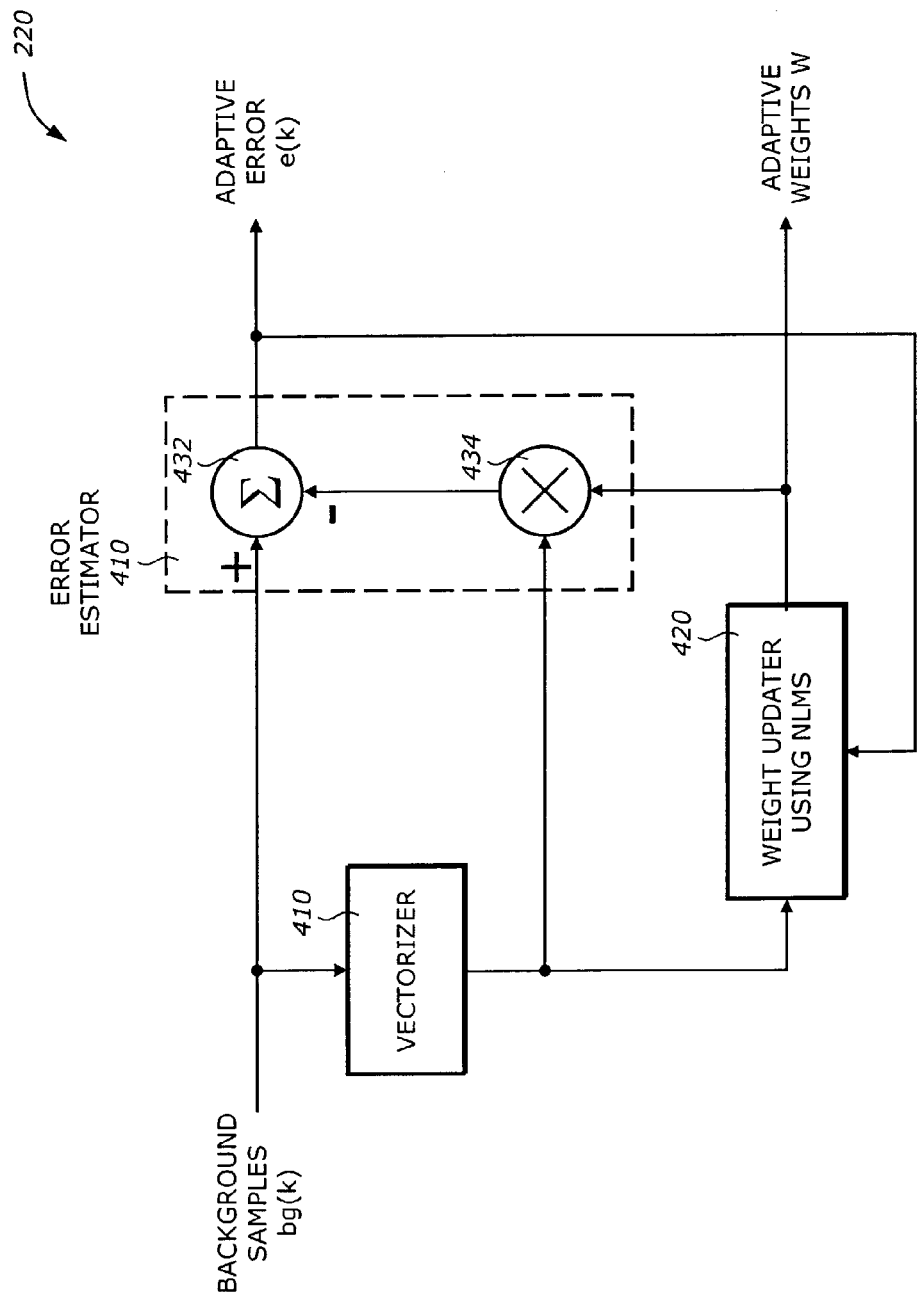
FIG. 4 is a diagram illustrating an adaptive predictor shown in FIG. 2 according to one embodiment of the invention.

FIG. 4 is a diagram illustrating the adaptive predictor 220 shown in FIG. 2 according to one embodiment of the invention. The adaptive predictor 220 includes a vectorizer 410, a weight updater 420, and an error estimator 430.

The vectorizer 410 delays the background samples bg(k) by P sample delays and vectorizes the delayed samples to form a vector u(k). In one embodiment, P=1, i.e., the vectorizer 410 is a unit delay. The vectorizer 410 may be implemented by a synchronizer, a flip-flop, a shift register, a memory unit, or any other suitable data structure.

The weight updater 420 updates the adaptive weights W using the adaptive error e(k). The weight updater 420 is an adaptive filter. In one embodiment, the weight updater 420 uses a normalized linear mean square (NLMS) to update the weight. The updating of the weights is performed when the input samples most likely contain background noise. This can be determined when the background sample is not equal to zero as shown in equation (6). When the background sample is equal to zero, the weights retain the old values. In other words, the weight vector W is updated when the input samples contain mostly background noise. The NLMS updating rule is given in the following:

$W(k+1) = W(k) + \mu e(k)[u(k)/(1 + u(k)u^T(k))]$ (7)

where k is the iterative index, W(k) is the weight vector, $\mu$ is the step size, e(k) is the adaptive error, u(k) is the vector of the delayed background samples. The superscript T indicates transposition.

The error estimator 430 estimates the adaptive error e(k). It includes a subtractor 432 and a multiplier 434. The multiplier 434 multiplies the delayed background samples u(k) with the adaptive weights W to provide an error product. The subtractor 432 subtracts the error product from the background samples bg(k) to provide the adaptive error e(k) as follows.

$e(k) = bg(k) - u(k)W^T$ (8)

Figure 5:
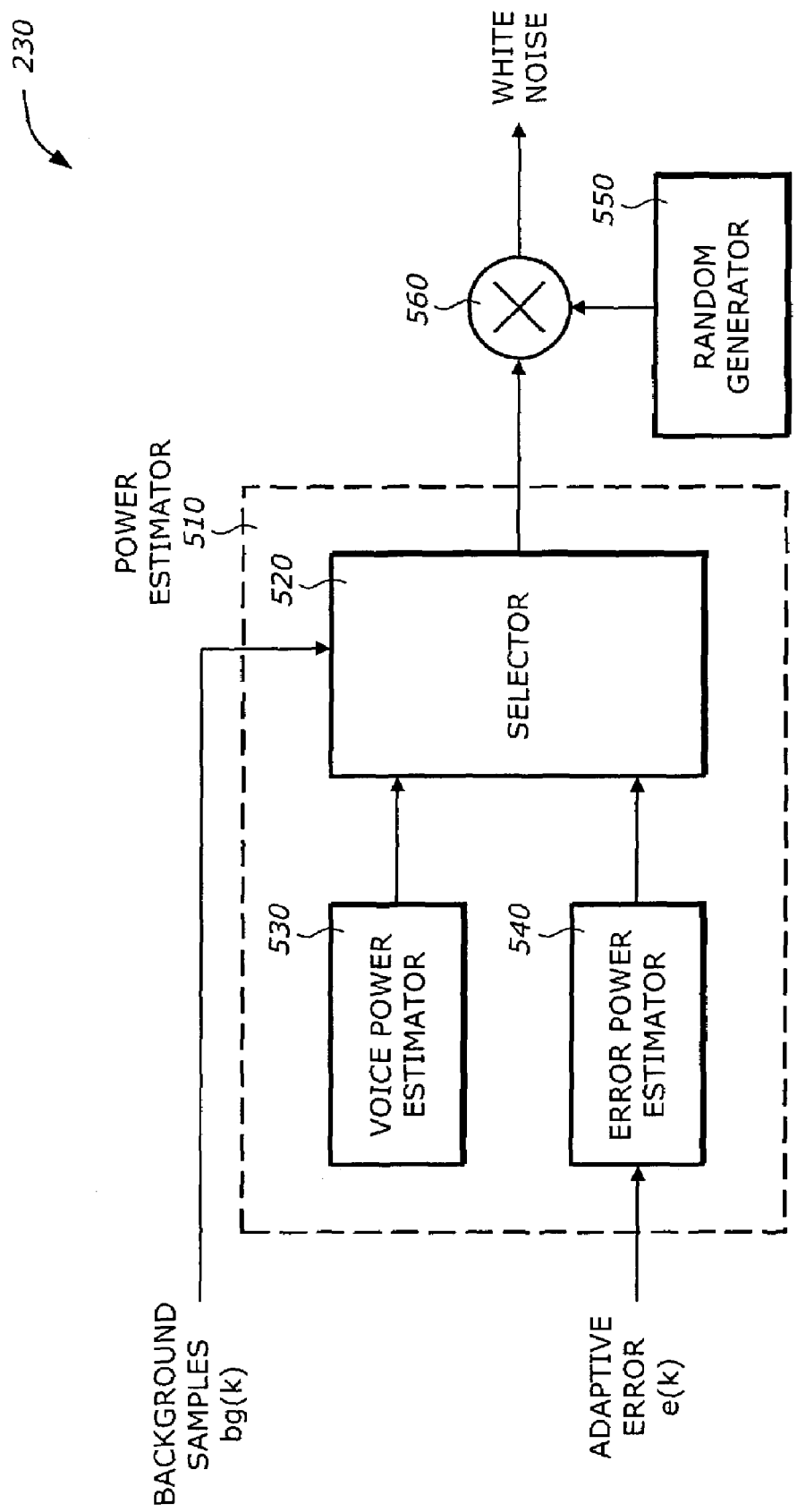
FIG. 5 is a diagram illustrating a system AR model white noise generator shown in FIG. 2 according to one embodiment of the invention.

FIG. 5 is a diagram illustrating the system AR model white noise generator 230 shown in FIG. 2 according to one embodiment of the invention. The system AR model white noise generator 230 includes a power estimator 510, a random generator 550, and a multiplier 560.

The power estimator 510 estimates power of the adaptive error e(k) using exponential weighting. The power estimator 510 includes a selector 520, a voice power estimator 530, and an error power estimator 540. The selector 520 selects one of the output of the voice power estimator 530 and the error power estimator 540 based on the background sample bg(k). When bg(k) is not equal to zero indicating that the input samples contain mostly background noise, the power of the error e(k) is computed using exponential weighting. When bg(k) is equal to zero, the power of the error e(k) is weighed without the contribution of the error term. Let s(k) be the power of the white noise, the power estimation is performed as follows.

if $bg(k) = 0$, $s(k) = \delta s(k-1)$ (9)

else $s(k) = (1-\phi)e(k)^2 + \phi s(k-1)$ (10)

where $\delta$ and $\phi$ are time constants for the exponential weighting and are selected according to the number of past samples that are to be weighed. In one embodiment, $\delta = 1 - 1/80000$ and $\phi = 1 - 1/NS$ where NS corresponds to the number of past samples. A typical value of NS is 2400.

The voice power estimator 530 computes the power according to equation (9) and the error power estimator 540 computes the power according to equation (10). The selector 520 also computes the square root of the selected s(k) from (9) and (10). The random generator 550 generates normally distributed random numbers that are within the proper range compatible with the power values. The multiplier 560 multiplies the square root of the estimated power s(k) with the random data to generated by the random generator 550 to produce the desired white noise h(k).

Figure 6:
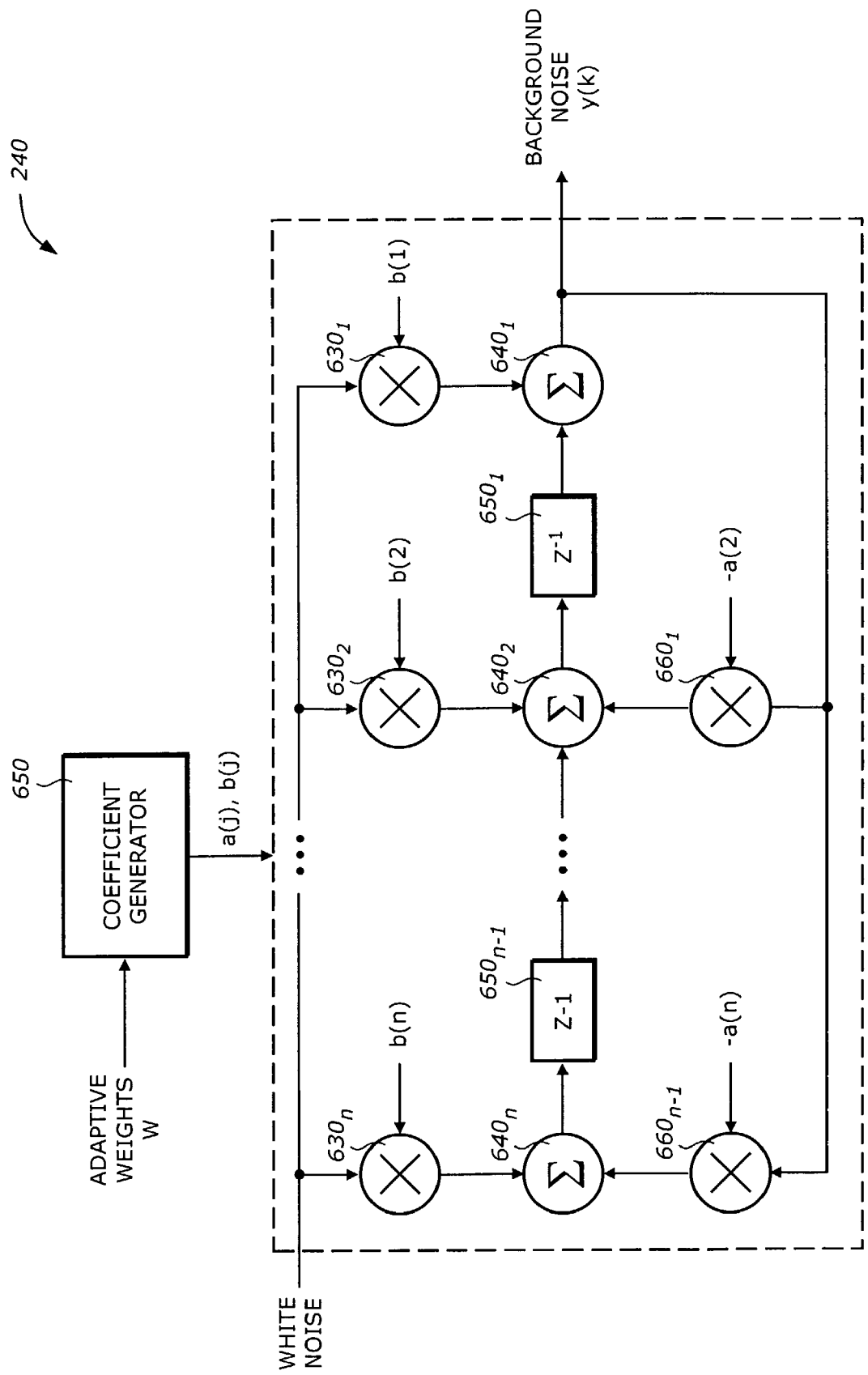
FIG. 6 is a diagram illustrating a background noise estimator shown in FIG. 2 according to one embodiment of the invention.

FIG. 6 is a diagram illustrating the background noise estimator 240 shown in FIG. 2 according to one embodiment of the invention. The background noise estimator 240 includes a coefficient generator 610 and a filter 620.

The coefficient generator 610 generates the coefficients from the estimated adaptive weights W. The coefficients a(j)'s and b(j)'s are used by the filter 620 to filter the white noise h(k) provided by the system AR model white noise generator 230. The coefficients a(j)'s are in essence the adaptive weights W. The coefficients b(j)'s are set to constant one.

The filter 620 filters the white noise h(k) using the coefficients a(j)'s and (b)'s. The filter 620 is a direct form II transposed implementation of the standard difference equation. The filter 620 includes N multipliers $630_1$ to $630_N$, N adders $640_1$ to $640_N$, (N−1) delay elements $640_2$ to $640_N$, and (N−1) multipliers $660_1$ to $660_{N-1}$. The arrangement of these elements is such that the background noise is computed according to the following:

$y(k) = b(1)h(k) + b(2)h(k-1) + \ldots b(r+1)h(k-r) - a(2)y(k-1) - \ldots a(k-j)$ (11)

Figure 7:
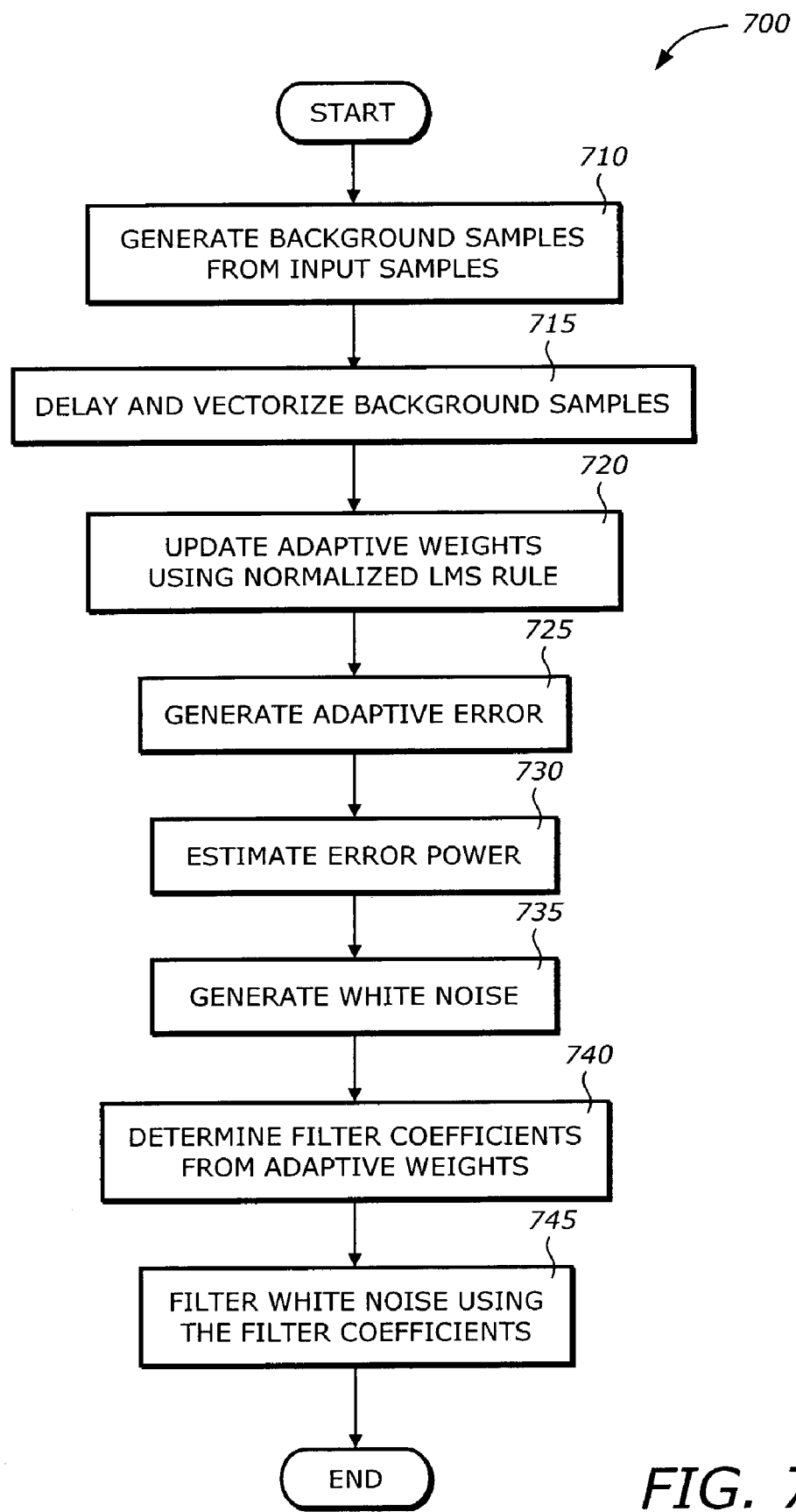
FIG. 7 is a flowchart illustrating a process to generate background noise according to one embodiment of the invention.

FIG. 7 is a flowchart illustrating a process 700 to generate background noise according to one embodiment of the invention.

Upon START, the process 700 generates the background samples from the input samples (Block 710). This can be accomplished by computing the short-term and long-term powers as shown in FIG. 3. Next, the process 700 delays the background samples and generates the background sample vector (Block 715).

Then, the process 700 updates the adaptive weights using the normalized LMS (NLMS) updating rule as given in equation (7) above. Next, the process 700 generates the adaptive error (Block 725) using equation (8). Then, the process 700 estimates the error power according to the background samples (Block 730) using equations (9) and (10). Next, the process 700 generates the white noise using the error power estimate and a random value (Block 735).

Then, the process 700 determines the filter coefficients a(j)'s and b(j)'s from the adaptive weights (Block 740). Next, the process 700 filters the white noise using the filter coefficients a(j)'s and b(j)'s (Block 745). Then, the process 700 is terminated.

Figure 8:
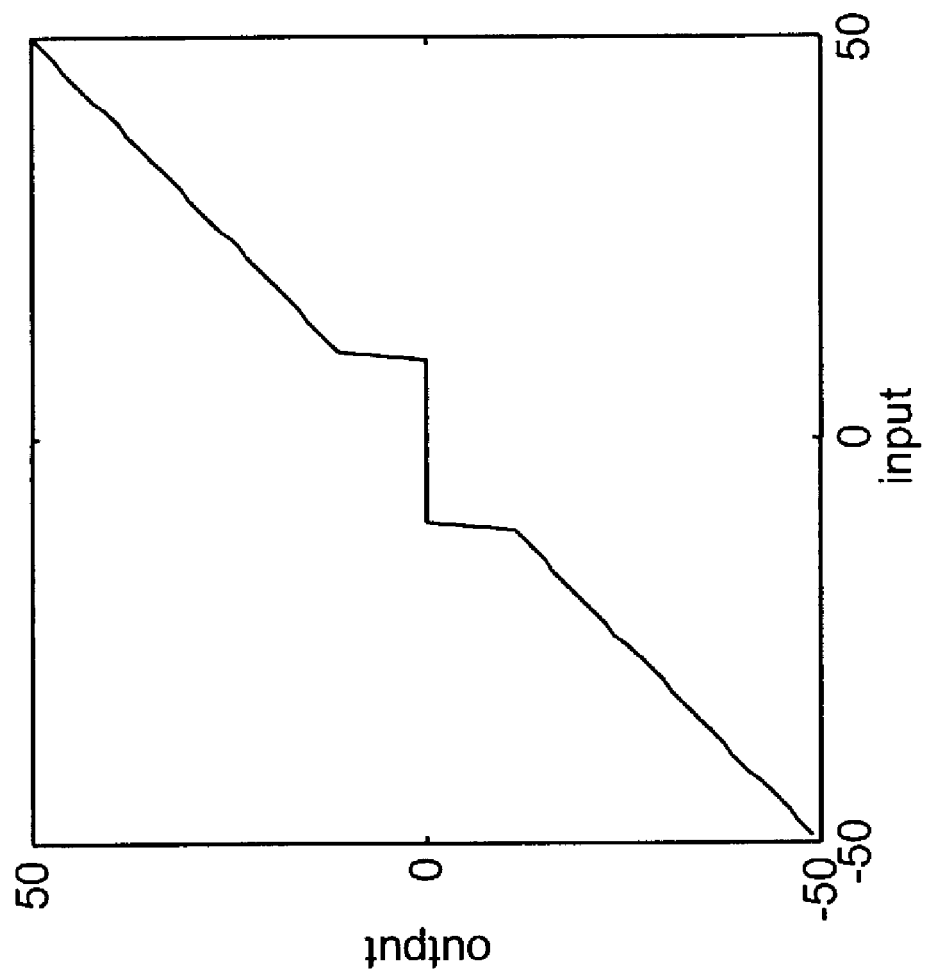
FIG. 8 is a diagram illustrating a characteristic of a non linear processor according to one embodiment of the invention.

FIG. 8 is a diagram illustrating a characteristic of a non-linear processor according to one embodiment of the invention.

The transfer characteristic is linear for large amplitude signals and almost zero for small amplitude signals. The threshold is adaptable and depends on the short-term average power in $R_{in}$. The error output of the non-linear processor is replaced by the background noise as generated by the noise matcher 127 when the signal is due to the residual in the Sin after echo cancellation. This can be determined by thresholding the absolute value of the error output by a predetermined threshold. If the threshold is not exceeded, then the signal is due to the residual.

The techniques are demonstrated by using $R_{in}$ and $S_{in}$ data files. These are approximately 30 second data files consisting of a far-end male speaker, a near-end female speaker and high level background noise.

Figure 9:
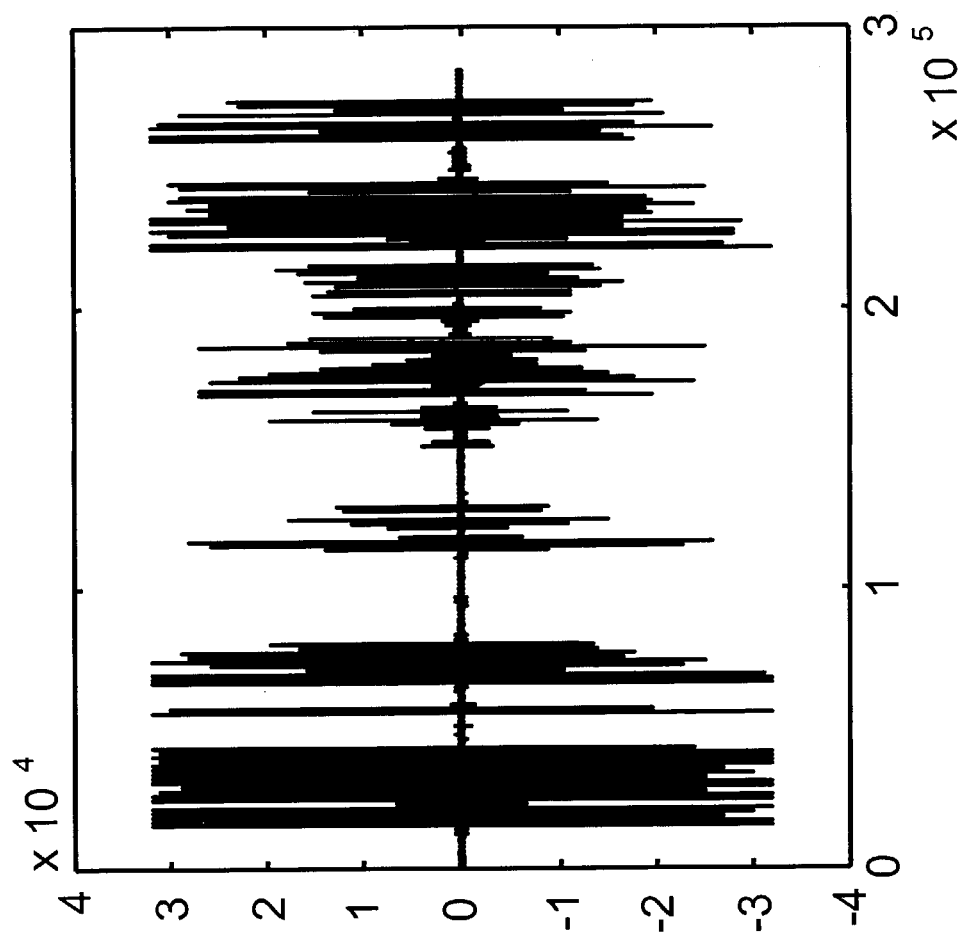
FIG. 9 is a diagram illustrating a near-end input waveform according to one embodiment of the invention.

FIG. 9 is a diagram illustrating a near-end input waveform according to one embodiment of the invention. The $R_{in}$ data show that the initial training period begins at about 14.5K iterations until about 45K iterations.

Figure 10:
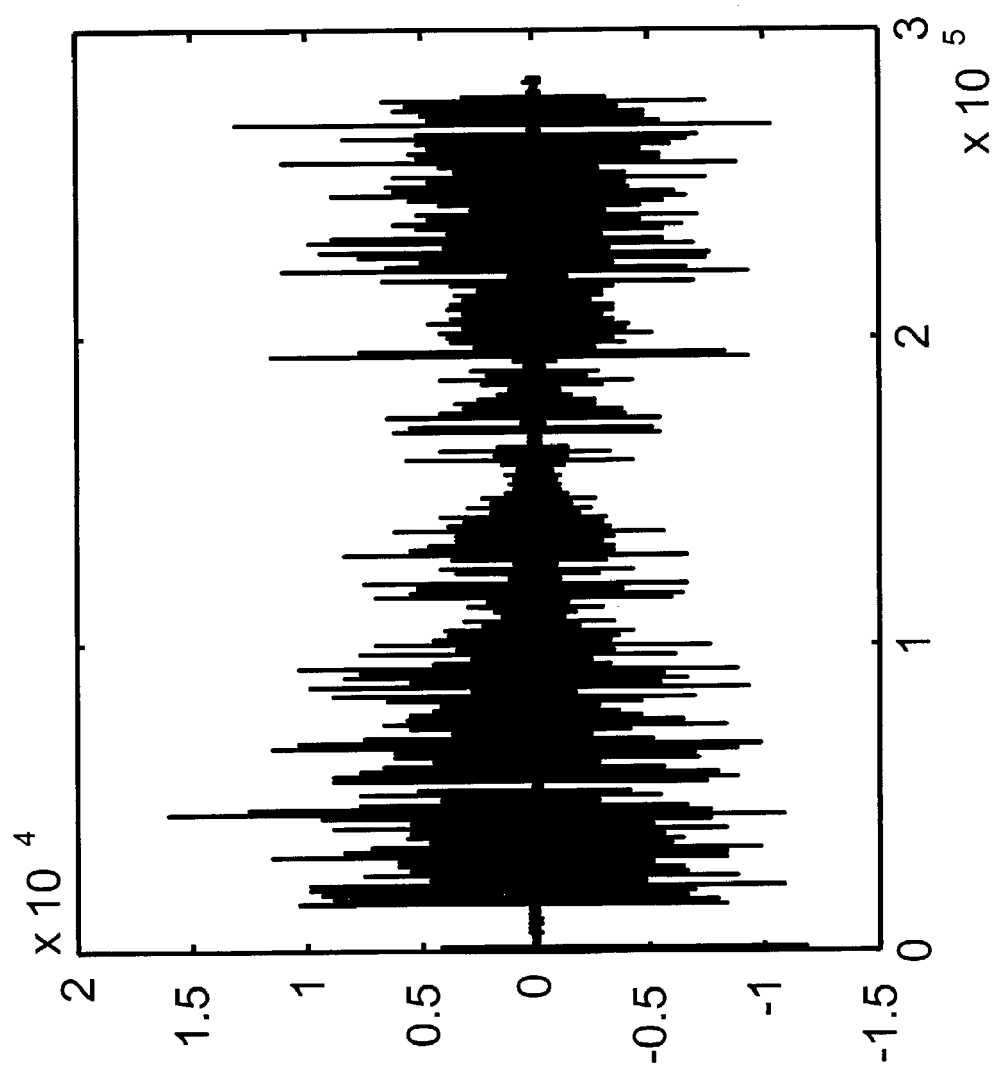
FIG. 10 is a diagram illustrating a far-end input waveform according to one embodiment of the invention.

FIG. 10 is a diagram illustrating a far-end input waveform according to one embodiment of the invention. The first two seconds of the $S_{in}$ data are background noise. This is followed by about 5 seconds worth of training samples by the far-end speaker. The remaining data file consists of a normal conversation by the two parties with occasional quiet periods when neither party is talking.

Correlating FIGS. 9 and 10 shows that the near-end speaker begins talking at about the time the initial training is completed. FIG. 9 also shows that there are many time periods when the far-end speaker is quiet. In addition, it can be seen that the near-end speaker is often talking while the far-end speaker is quiet. Occasionally, both speakers are active. There are also intervals that neither speaker is active.

Figure 11:
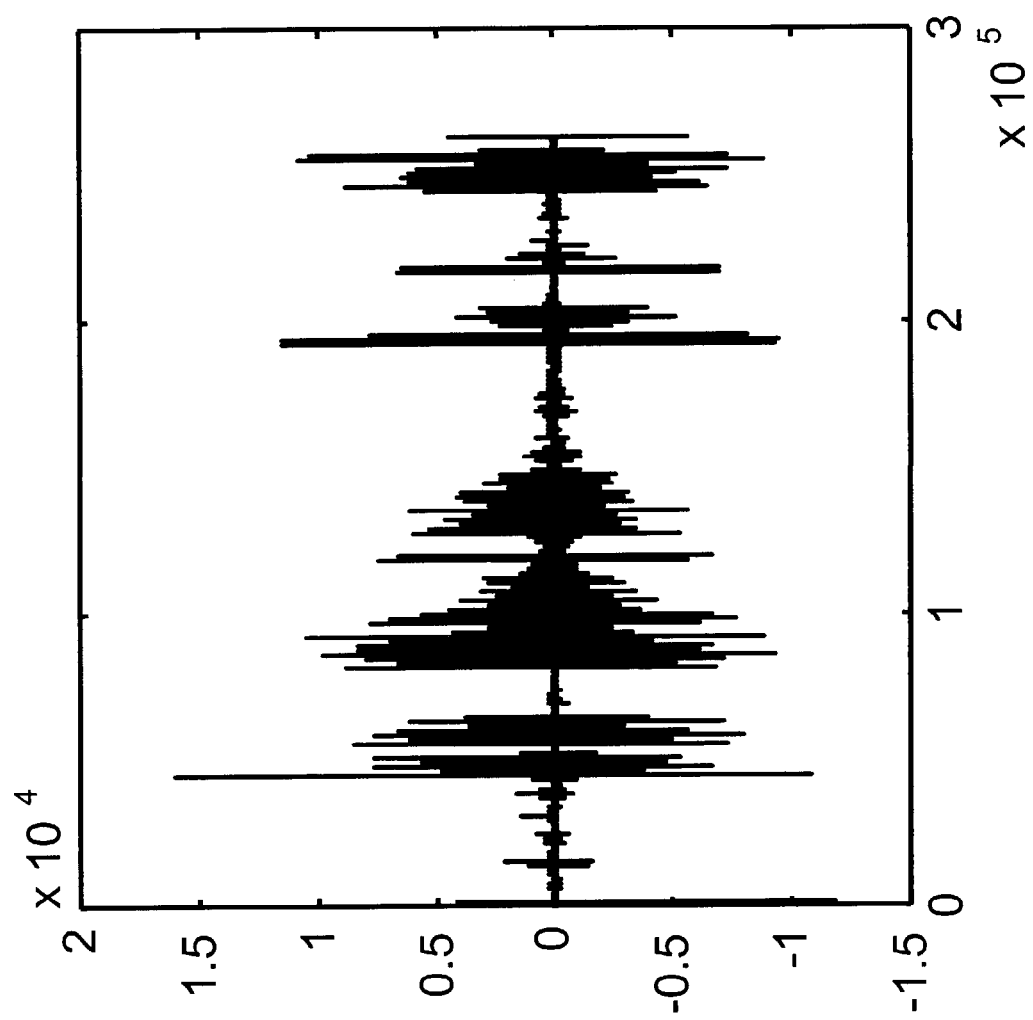
FIG. 11 is a diagram illustrating an output error waveform according to one embodiment of the invention.

FIG. 11 is a diagram illustrating an output error waveform according to one embodiment of the invention. Comparing the output error waveform with the $S_{in}$ data shows that the far-end speaker is canceled and replaced by low-level background noise as desired.

Figure 12:
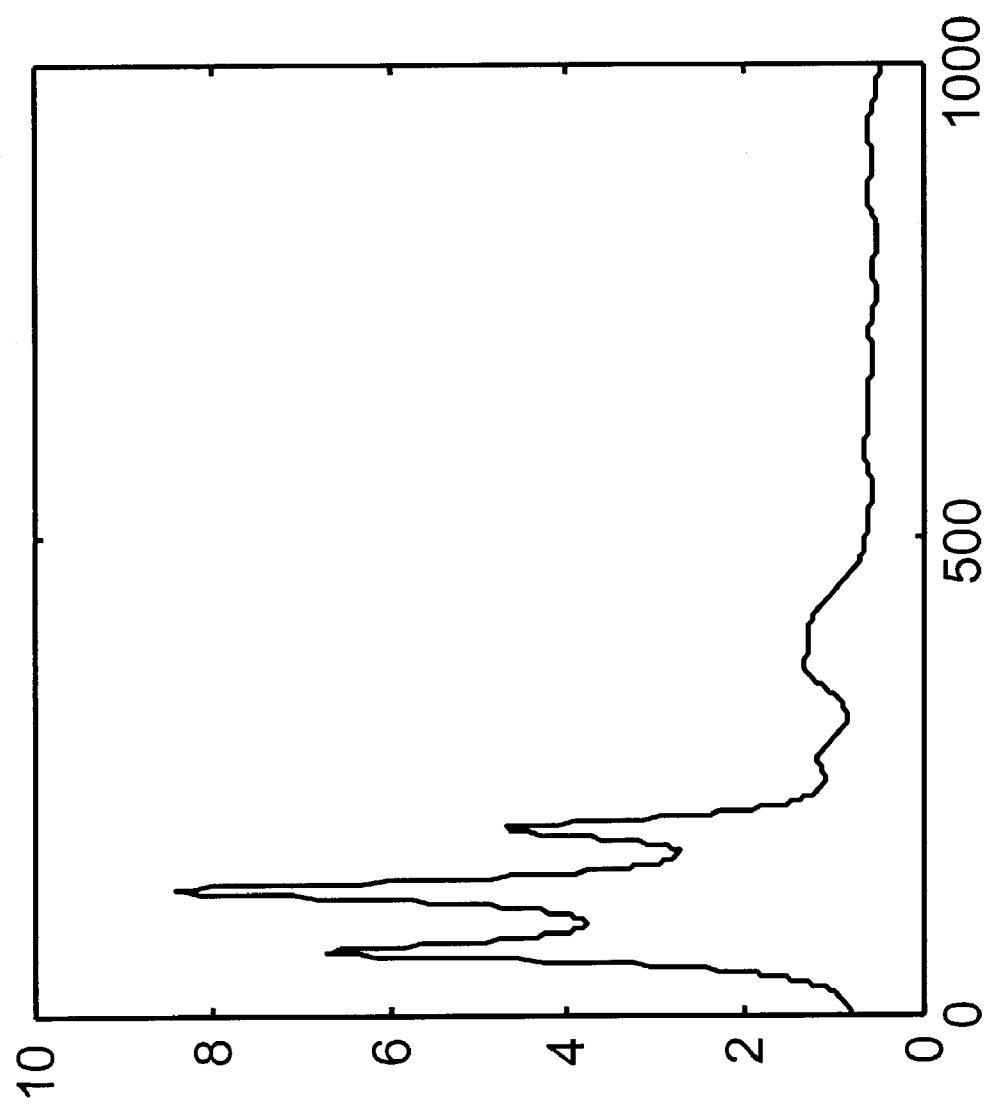
FIG. 12 is a diagram illustrating an absolute value of transfer function of the adaptive predictor according to one embodiment of the invention.

FIG. 12 is a diagram illustrating an absolute value of transfer function of the adaptive predictor according to one embodiment of the invention. The waveform shows the characteristics at 260K iterations. The waveform displays a large response to several harmonic components, one of which is the telephone ringing in the background. This can be clearly heard on the $S_{in}$ data file at about 164K-167K iterations. This also clearly appears in the error output waveform in FIG. 11, not only at this time, but also at subsequent times, simulating the characteristics of the actual background noise.

Figure 13:
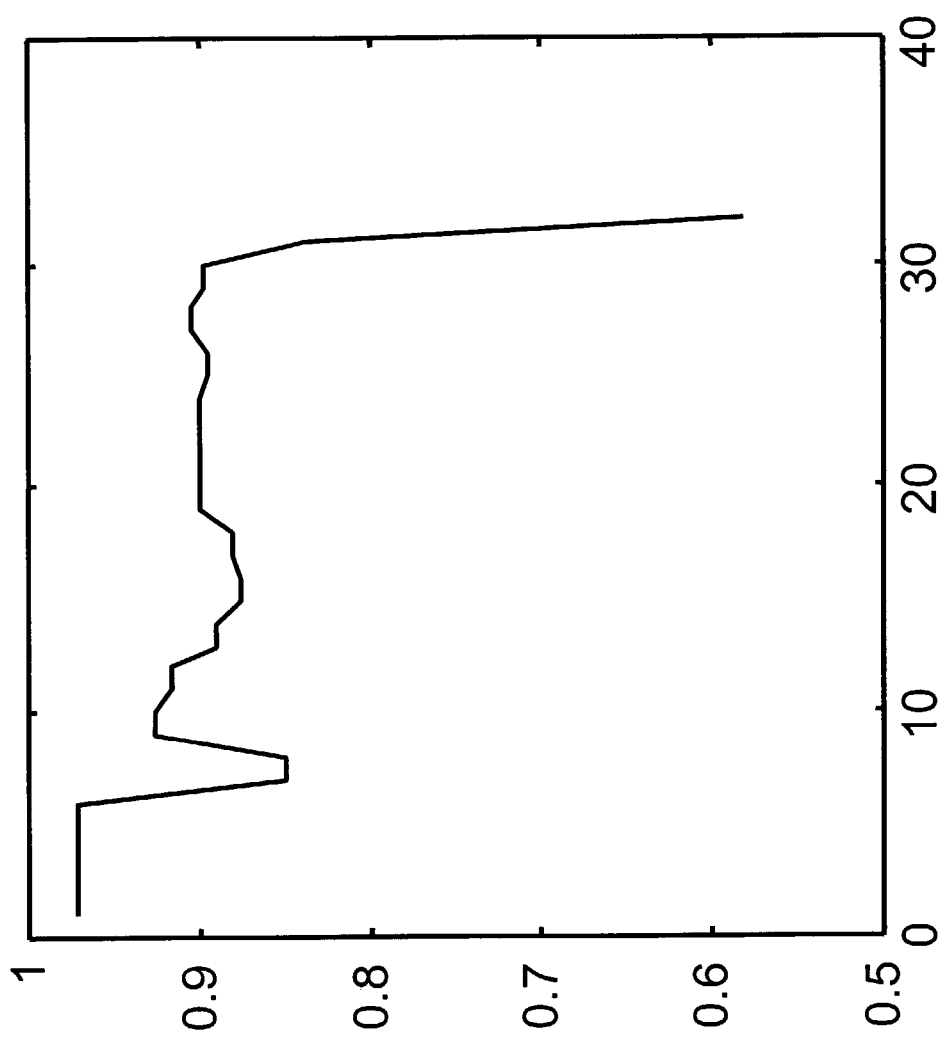
FIG. 13 is a diagram illustrating an absolute value of zeros of the adaptive predictor according to one embodiment of the invention.

FIG. 13 is a diagram illustrating an absolute value of zeros of the adaptive predictor according to one embodiment of the invention. The diagram shows the closeness of the zeros of the adaptive predictor to the unit circle. The angle of these roots likely correspond to the peaks in FIG. 12. These roots are not moved outside the unit circle for extended periods to avoid instability of the slave AR parameter estimator.

Figure 14:
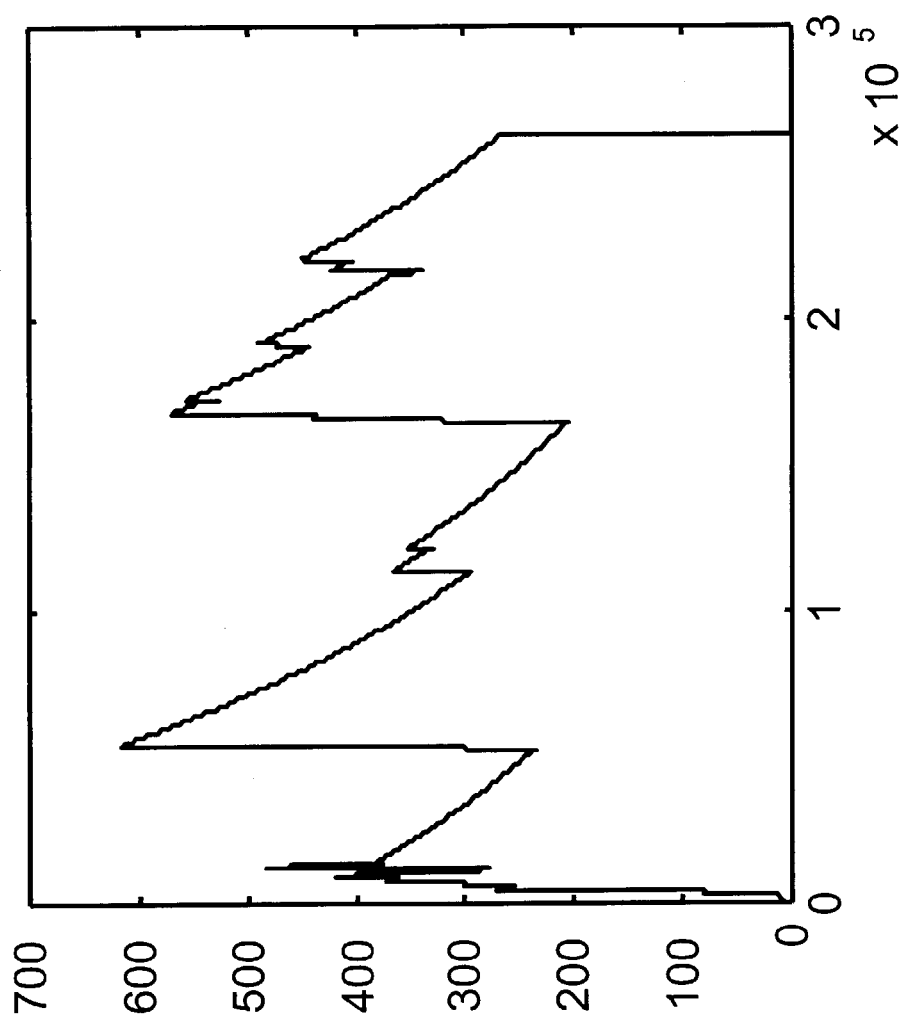
FIG. 14 is a diagram illustrating an estimate of white noise power waveform according to one embodiment of the invention.

FIG. 14 is a diagram illustrating an estimate of white noise power waveform according to one embodiment of the invention. The white noise power waveform can be used to identify the intervals when neither speaker is active. These intervals correspond to the spikes in the white noise power waveform.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    an adaptive predictor to estimate adaptive weights of autoregressive (AR) model of background noise from background samples in an echo canceler, the adaptive predictor generating an adaptive error;
    a system white noise generator to generate a white noise using the adaptive error; and
    a background noise estimator to estimate the background noise using the white noise and the estimated adaptive weights.

2. The apparatus of claim 1 further comprising:
    a background noise modeler to generate the background samples from input samples.

3. The apparatus of claim 2 wherein the adaptive predictor comprises:
    an error estimator to estimate the adaptive error; and
    a weight updater to update the adaptive weights using the adaptive error.

4. The apparatus of claim 3 wherein the adaptive predictor further comprises:
    a vectorizer to vectorize the background samples.

5. The apparatus of claim 4 wherein the error estimator comprises:
    a multiplier to multiply the vectorized background samples with the adaptive weights to provide an error product; and
    a subtractor to subtract the error product from the background samples to provide the adaptive error.

6. The apparatus of claim 4 wherein the weight updater comprises:
    a normalized least mean square error (NLMS) estimator to update the adaptive weights.

7. The apparatus of claim 1 wherein the system white noise generator comprises:
    a power estimator to estimate power of the adaptive error using exponential weighting; and
    a multiplier to multiply square root of the estimated power with a random data to generate the white noise.

8. The apparatus of claim 1 wherein the background noise estimator comprises:
    a coefficient generator to generate coefficients from the estimated adaptive weights; and
    a filter to filter the white noise using the coefficients.

9. The apparatus of claim 2 wherein the background noise modeler comprises:
    a short-term power estimator to estimate a short-term power in the input samples;
    a long-term power estimator to estimate a long-term power in the input samples; and
    a thresholder to generate the background samples when the short-term power is less than an indicator of the long-term power.

10. The apparatus of claim 9 wherein the thresholder sets the background samples equal to the input samples in response to the short-term power being less than the indicator of the long-term power.

11. A method comprising:
    estimating adaptive weights of autoregressive (AR) model of background noise from background samples in an echo canceler by an adaptive predictor, the adaptive predictor generating an adaptive error;
    generating a white noise using the adaptive error; and
    estimating the background noise using the white noise and the estimated adaptive weights.

12. The method of claim 11 further comprising:
    generating the background samples from input samples.

13. The method of claim 12 wherein estimating the adaptive weights comprises:
    estimating the adaptive error; and
    updating the adaptive weights using the adaptive error.

14. The method of claim 13 wherein estimating the adaptive weights further comprises:
   vectorizing the background samples.

15. The method of claim 14 wherein estimating the adaptive error comprises:
   multiplying the vectorized background samples with the adaptive weights to provide an error product;
   subtracting the error product from the background samples to provide the adaptive error.

16. The method of claim 14 wherein updating the adaptive weights comprises:
   updating the adaptive weights using a normalized least mean square error (NLMS) estimator.

17. The method of claim 11 wherein generating a white noise comprises:
   estimating power of the adaptive error using exponential weighting; and
   multiplying square root of the estimated power with a random data to generate the white noise.

18. The method of claim 11 wherein estimating the background noise comprises:
   generating coefficients from the estimated adaptive weights; and
   filtering the white noise using the coefficients.

19. The method of claim 12 wherein generating the background samples comprises:
   estimating a short-term power in the input samples;
   estimating a long-term power in the input samples; and
   generating the background samples when the short-term power is less than an indicator of the long-term power.

20. The method of claim 19 wherein generating the background samples comprises setting the background samples equal to the input samples in response to the short-term power being less than the indicator of the long-term power.

21. An article of manufacture comprising:
   a machine-accessible storage medium including data that, when accessed by a machine, causes the machine to perform operations comprising:
      estimating adaptive weights of autoregressive (AR) model of background noise from background samples in an echo canceler by an adaptive predictor, the adaptive predictor generating an adaptive error;
      generating a white noise using the adaptive error; and
      estimating the background noise using the white noise and the estimated adaptive weights.

22. The article of manufacture of claim 21 wherein the data further causes the machine to perform operations comprising:
   generating the background samples from input samples.

23. The article of manufacture of claim 22 wherein the data causing the machine to perform estimating the adaptive weights comprises data, when accessed by the machine, that causes the machine to perform operations comprising:
   estimating the adaptive error; and
   updating the adaptive weights using the adaptive error.

24. The article of manufacture of claim 23 wherein the data causing the machine to perform estimating the adaptive weights further comprises data, when accessed by the machine, that causes the machine to perform operations comprising:
   vectorizing the background samples.

25. The article of manufacture of claim 24 wherein the data causing the machine to perform estimating the adaptive error comprises data, when accessed by the machine, that causes the machine to perform operations comprising:
   multiplying the vectorized background samples with the adaptive weights to provide an error product; and
   subtracting the error product from the background samples to provide the adaptive error.

26. The article of manufacture of claim 24 wherein the data causing the machine to perform updating the adaptive weights comprises data, when accessed by the machine, that causes the machine to perform operations comprising:
   updating the adaptive weights using a normalized least mean square error (NLMS) estimator.

27. The article of manufacture of claim 21 wherein the data causing the machine to perform generating a white noise comprises data, when accessed by the machine, that causes the machine to perform operations comprising:
   estimating power of the adaptive error using exponential weighting; and
   multiplying square root of the estimated power with a random data to generate the white noise.

28. The article of manufacture of claim 21 wherein the data causing the machine to perform estimating the background noise comprises data, when accessed by the machine, that causes the machine to perform operations comprising:
   generating coefficients from the estimated adaptive weights; and
   filtering the white noise using the coefficients.

29. The article of manufacture of claim 22 wherein the data causing the machine to perform generating the background samples comprises data, when accessed by the machine, that causes the machine to perform operations comprising:
   estimating a short-term power in the input samples;
   estimating a long-term power in the input samples; and
   generating the background samples in response to the short-term power being less than an indicator of the long-term power.

30. The article of manufacture of claim 29 wherein the data causing the machine to perform generating the background samples comprises data, when accessed by the machine, that causes the machine to perform operations comprising setting the background samples equal to the input samples when the short-term power is less than the indicator of the long-term power.

31. A system comprising:
   a send input decoder to decode a near end signal at a near end, the decoder generating input samples;
   an echo canceler in an echo channel to perform echo cancellation; and
   a noise matcher to match background noise, the noise matcher comprising:
      an adaptive predictor to estimate adaptive weights of autoregressive (AR) model of the background noise from background samples in the echo canceler, the adaptive predictor generating an adaptive error,
      a system white noise generator coupled to the adaptive predictor to generate a white noise using the adaptive error, and
      a background noise estimator coupled to the system white noise generator and the adaptive predictor to estimate the background noise using the white noise and the estimated adaptive weights.

32. The system of claim 31 further comprising:
   a send output encoder to provide speech compression.

33. The system of claim 32 further comprising:
   a receiver input decoder to decompress speech data received from a far end; and
   a receiver output encoder to encode linear data samples from the echo channel, the encoded linear data samples being sent out to the near end.

34. The system of claim 33 wherein the send input decoder is one of a µ-Law and A-Law decoder.

35. The system of claim 34 wherein the send output encoder compresses speech data from the echo channel, the compressed speech data being sent to the far end.

* * * * *

UNITED STATES PATENT AND TRADEMARK OFFICE
CERTIFICATE OF CORRECTION

PATENT NO. : 7,627,111 B2
APPLICATION NO. : 10/305222
DATED : December 1, 2009
INVENTOR(S) : Bershad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1373 days.

Signed and Sealed this

Twenty-first Day of December, 2010

David J. Kappos
*Director of the United States Patent and Trademark Office*